United States Patent [19]
Bailey et al.

[11] 3,750,165
[45] July 31, 1973

[54] INTRUSION DETECTION APPARATUS HAVING A HIGH FREQUENCY DIODE OSCILLATOR-MIXER ELEMENT

[75] Inventors: James R. Bailey; Carl F. Klein; Lawrence B. Korta; Donald F. Pridemore, all of Milwaukee, Wis.

[73] Assignee: Johnson Service Company, Milwaukee, Wis.

[22] Filed: Aug. 16, 1971

[21] Appl. No.: 172,052

[52] U.S. Cl. .................. 343/5 PD, 343/7.7, 343/8
[51] Int. Cl. .......................... G01s 9/02, G08b 13/22
[58] Field of Search .................. 343/5 PD, 7.7, 8

[56] References Cited
UNITED STATES PATENTS
3,659,293   4/1972   Gupta ................................. 343/8 X
3,611,374   10/1971  Draysey ............................. 343/8 X Primary Examiner—T. H. Tubbesing
Attorney—Arnold J. De Angelis et al.

[57] ABSTRACT

An intrusion detector detects motion of a human intruder into a selected volumetric space. An oscillator-detector avalanche or impatt diode operating above 4GHz is mounted within an open ended conductive cavity of a coaxial line construction to define the active transmitting and mixing element of an oscillator-mixer establishing an RF field in the selected space and receiving the motion related signals via a common antenna. The diode is exposed to both the transmitted and the echo signal and produces a Doppler frequency output signal which is connected to an alarm. The system antenna and a load coupling impedance transformer are selected to optimize the magnitude of the Doppler motion signal response sensitivity. The microwave frequency oscillator signal is modulated by loosely coupling a general purpose diode to the open end of the oscillator-mixer open ended cavity.

14 Claims, 6 Drawing Figures

PATENTED JUL 31 1973          3,750,165
SHEET 1 OF 2
FIG_2
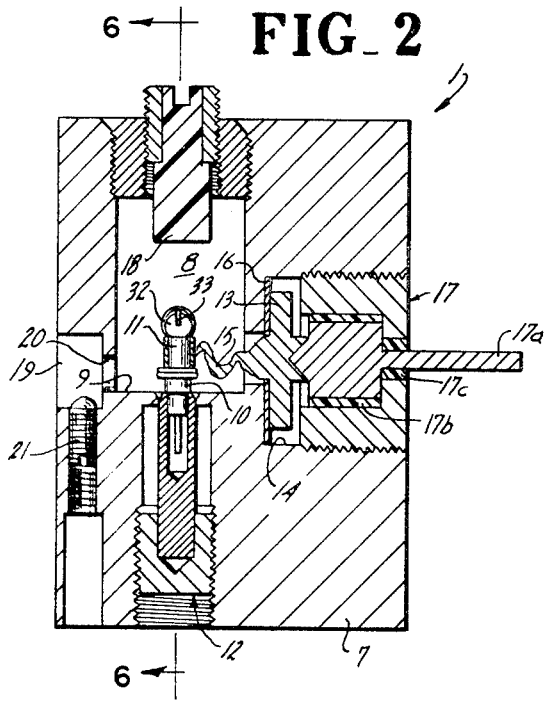
FIG_1
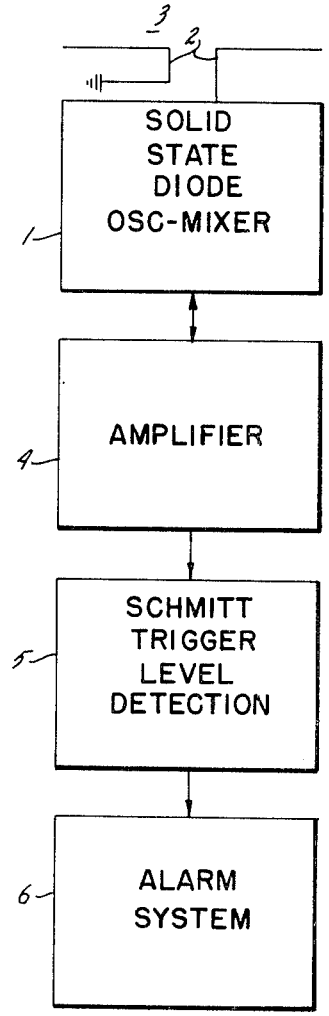
FIG_3
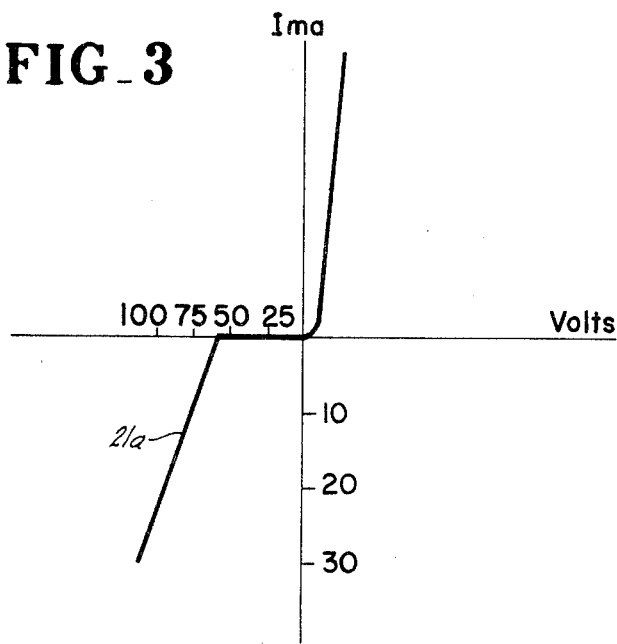
INVENTORS
JAMES R BAILEY
CARL F. KLEIN
LAWRENCE B KORTA
DONALD F. PRIDEMORE
BY
Attorneys

INVENTORS
JAMES R BAILEY
CARL F. KLEIN
LAWRENCE B. KORTA
DONALD F. PRIDEMORE
BY

*Andrus, Sceales, Starke & Sawall*

Attorneys

"INTRUSION DETECTION APPARATUS HAVING A HIGH FREQUENCY DIODE OSCILLATOR-MIXER ELEMENT"

BACKGROUND OF THE INVENTION

This invention relates to a motion detector employing a high radio frequency field within a volumetric space to be protected by responding to Doppler motion phenomena.

Movement and entrance within particular volumetric areas or spaces may be protected through various automatic signalling devices. Generally the intrusion detection systems are based on the concept of radiating energy such as ultrasonic or electromagnetic energy within the volumetric space and detecting the presence of an intruder therein by detecting any change in the energy field distribution and movement as the result of the intruder's motion and entrance. Highly satisfactory systems have been developed based on the Doppler phenomena wherein an oscillator is coupled through a suitable antenna to establish a radio frequency radiation pattern within the space to be protected. The movement of an intruding body such as an unauthorized person results in an echo signal the frequency of which is shifted from the original frequency by an amount dependent on the radial velocity of the target. The Doppler frequency signal is detected and utilized to trigger a suitable indicating device or alarm to thereby indicate and record the presence of an intruder. Thus the basic operation of a low powered Doppler motion detector is based on the comparison of the transmitted and the echo signal. The difference between the transmitted and received signal frequency is the related Doppler motion frequency. The Doppler motion frequency which is of a corresponding low frequency can then be fed into any suitable signal processing and level detection circuitry.

A highly improved motion detection apparatus employing the Doppler frequency effect is disclosed in the copending application of Carl F. Klein entitled "MOTION DETECTOR" which was filed Jan. 31, 1969 with Ser. No. 796,945 now U.S. Pat. No. 3,668,703 and which application is assigned to a common assignee herewith. More fully disclosed is such application is a transistor mounted within the base of an open ended wqve guide or cavity and interconnected to form an oscillator circuit. The transistor functions to establish the transmitted radio frequency energy. Further, the non-linear characteristic of the transistor performs the mixing of the transmitted and the received or echo signals and provides an output including the sum and different frequencies of the transmitted and received signals as well as the higher order of the harmonic terms of such signals.

The output is passed through a low pass filter to a suitable detection circuit. The transistor has a very distinct advantage of providing not only the function of transmission and detection of the reflected signals but also produces amplification. Although the system operates satisfactorily the non-linear characteristic of a transistor does not provide the optimum diode mixing characteristic and relatively expensive transistors are required.

Further avalanche and bulk effect diodes have been employed in microwave oscillaor circuits. For example, U.S. Pat. No. 3,443,244 discloses a coaxial resonator employing an avalanche diode forming a part of a closed cavity resonator extending across wave guide 2. U.S. Pat. No. 3,416,098 discloses a bulk effect diode mounted as a part of a coaxial microwave unit for transmitting a radial frequency field from the open end of the coaxial line. However, such devices employ completely separate detection circuitry or receivers, and have not found application in intrusion detection apparatus and the like employing Doppler frequency controls.

U.S. Pat. No. 3,383,682 which issued May 14, 1968, discloses a Doppler frequency device employing a tunnel diode as a part of a resonant cavity for generating a radio frequency field and for mixing the transmitted and echo signals in applying such into a signal processing system to produce a Doppler frequency detector. However, tunnel diodes are relatively inefficient signal mixing devices and furthermore operate at very low power and relatively low frequencies. For example, they will normally have a maximum operating frequency of from 1 to 2 gigahertz (GHz). Thus, although such a device as a tunnel diode can in theory be applied to an oscillator-mixer, they are known to have very distinct disadvantages and limiting features from a practical application. As a result the transistor mixer oscillator system of the above application provides a much more practical solution based on the art prior to the present invention.

SUMMARY OF THE PRESENT INVENTION

The present invention is particularly directed to a Doppler frequency detection unit employing a two-terminal oscillator-mixer element in the form of a high frequency solid state diode of the impatt (Impact Avalanche Transit Time) type phenomena or the bulk effect negative conductance phenomena, with such element mounted with an open ended coaxial cavity and operating above 4GHz. Applicants have found that the characteristic of such diodes and particularly that of the avalanche diode are significantly different than the characteristics of the tunnel diode and furthermore are such that when combined with an open ended coaxial cavity they function as a combined active oscillator-detector element to produce a highly satisfactory and sensitive intrusion apparatus based on the Doppler frequency concept. The present invention is particularly directed to the conventional intrusion detection apparatus wherein it is desired to establish a field within a preselected volume such as a bulding or a room within a building. The avalanche and the bulk effect diodes have a very high degree of thermal stability and thus operate satisfactorily in the conventional human intrusion detection apparatus which should normally operate at either frequencies of 5.8, 10.525 or 22.125 GHz. The avalanche diode in particular, as previously noted, approximates the characteristic of a perfect mixer diode with a highly improved conversion efficiency. Consequently, it provides a maximum possible Doppler signal output. Further it operates with very low noise high efficiency and high thermal stability.

Further, Applicants have found that the output power, efficiency and mixer sensitivity may peak at different input power levels. Apparently the particular output power level at which the several characteristics peak is related to the diode's impedance which, in turn, is a function of the input bias level. The diode impedance value for maximizing the several individual functions is different for each. However, Applicants realize that this may provide a desirable characteristic and that as the peak values of output power and efficiency do not coincide the output power can be significantly reduced without affecting the amplitude of the Doppler motion signal.

Applicants have found that the magnitude of the Doppler motion signal also depends on the load impedance of the oscillator-mixer which, in turn, is determined by the systems antenna impedance and the oscillator-mixer impedance coupling transformer. The impedance coupling transformer can be made adjustable and the overall system adjusted to provide optimum continuous sensitivity performance with relatively large variations in the load impedance.

Further, Applicants have found that the solid state diode oscillator-mixer can be modulated by loosely coupling a general purpose diode to the open end of the oscillator-mixer cavity. The modulating diode in a preferred construction is coupled to the oscillator via a small coupling loop located within an opening immediately above the oscillator's open coaxial transmission line. The modulating hole and the coupling loop are generally located in the field of the oscillator's open transmission line cavity to produce the desired modulation. It is important that it be relatively accurately located within the oscillator's cavity to minimize the effect on the cavity impedance and the resulting oscillator stability.

Thus the present invention provides an improved two terminal oscillator-mixer particularly for intrusion detection apparatus and the like with means to optimize the construction of the device for optimum overall operation with the required sensitivity and amplitude of an alarm signal in response to selected intrusion or movement of an intruder within the selected area of volumetric space.

BRIEF DESCRIPTION OF THE DRAWINGS

The drawings furnished herewith illustrate the best mode presently contemplated by the inventors for carrying out the present invention and clearly disclose the above advantages and features as well as others which will be readily understood from the following description of the illustrated embodiment.

In the drawings:

FIG. 1 is a block diagram of a low powered C-W Doppler motion detection system;

FIG. 2 is a vertical section through a two terminal diode oscillator-mixer unit constructed in accordance with the present invention and shown in block diagram in FIG. 1;

FIG. 3 is a graphical illustration of the voltage-current characteristic of an avalanche diode clearly illustrating the diode mixer non-linear characteristic;

DESCRIPTION OF THE ILLUSTRATED EMBODIMENT

Figure 4:
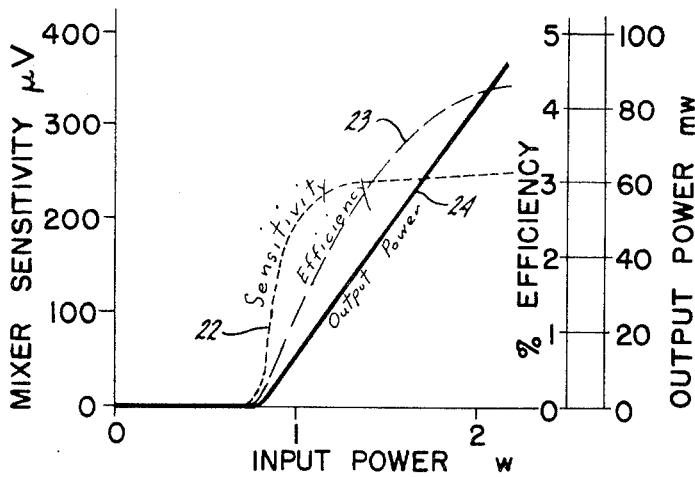
FIG. 4 is a graphical illustration showing various characteristics and particularly the sensitivity, the efficiency and the output power of the Doppler oscillator-mixer with various input powers.
Figure 6:
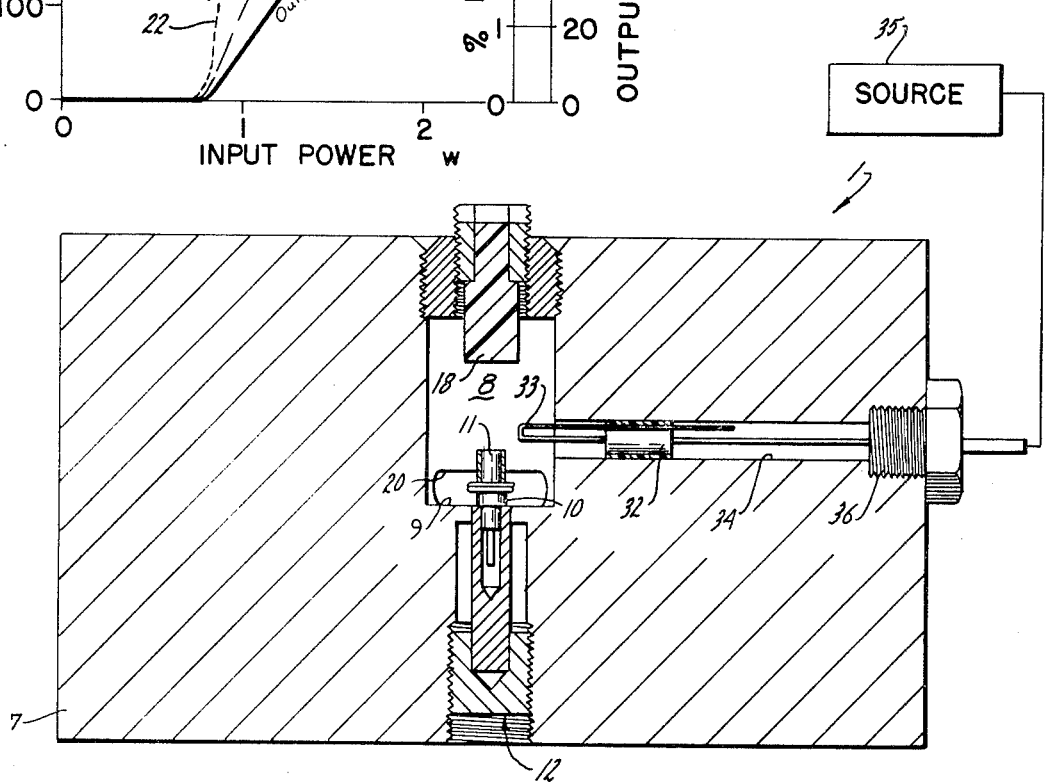
FIG. 6 is a sectional view of the oscillator-mixer taken on line 6—6 of FIG. 1, showing a special oscillator modulating diode unit.

Referring to the drawings and particularly to FIG. 1 and 2 the illustrated motion detection system includes a solid state diode oscillator-mixer 1 driven from a suitable constant current regulated power supply and coupled to a radiating and receiving antenna 2 for transmitting and establishing a radio frequency (RF) field within an area or volumetric space 3 to be protected and to receive motion related signals resulting from movement of an intruder within the area or space 3. The output of the oscillator-mixer 1 is coupled to a suitable amplifier-filter unit 4 which will pass the difference or Doppler frequency signal as an amplified motion detection signal. A level detection circuit such as a Schmitt trigger 5 is connected to the output of the amplifier 4 and is actuated when the Doppler related signal reaches a selected level. The output of the Schmitt trigger in turn actuates a sutiable indicating or alarm system 6. The present invention is particularly directed to the construction of the oscillator-mixer 1 and as the other elements may take any desired construction no further illustration or description thereof is given.

Further the solid state diode oscillator-mixer unit 1 preferably is constructed to incorporate the capacitive tuning and coupling teaching of the co-pending application entitled "Microwave Cavity Oscillator" which was filed on Mar. 2, 1970 with Ser. No. 15,478, now U.S. Pat. No. 3,624,555 by Carl F. Klein and which is assigned to the same assignee as this application. A construction similar to the oscillator unit of the above application is shown in FIG. 2 for the oscillator-mixer of the present invention.

Generally, the oscillator-mixer unit includes a cavity block 7 which is provided with a cavity 8 in one side wall terminating in a mounting wall 9. A solid state microwave diode 10 of the impatt or bulk effect type is mounted adjacent and abutting the base wall 9 and, in the present invention, functions as not only the oscillator active element but also the mixer active element. A conductor 11 is secured to the diode and projects coaxially outwardly therefrom, forming a coaxial transmission line with the cylindrical cavity walls. The diode 10 and attached transmission line 11 is secured within the unit through a suitable plug and collet pin support 12 located with an appropriately threaded recess in the opposite wall of the cavity block 7 in alignment with the cavity 8.

The diode 1 is illustrated as a studded pill type unit and consequently is mounted with a tapered collet type support. If the diode 1 has a threaded mounting stud it can of course be mounted directly into the cavity by directly threading the diode into an appropriately threaded opening in the base of the cavity. This cavity also serves the essential function of removing heat from the packaged diode.

A bias disc 13 is mounted within a lateral recess 14 and connected to the transmission line 11 through a bias wire 15 wound to also function as an RF choke. A dielectric member 16 is clamped between the base of the recess and the disc 13 to form a first RF by-pass. The disc 13 is mounted within the opening 14 along with an input power or a bias plug and insulating assembly 17 which energizes the diode 10 to produce oscillation and generation of an RF field in the cavity 8 and form a second RF by-pass. The assembly 17 includes an annular support which threads into the recess 14 and a bias connector pin 17a with a relatively large body portion abutting the disc 13 in clamping relationship. A surrounding relatively thin dielectric member 17b such as a mylar tape or the like is interposed between the body portion of pin 17a and the threaded support to define a second capacitance by-passing RF energy to the cavity body. The outer portion of the annual support through which pin 17a projects is closed by a suitable dielectric support 17c. This assembly therefore provides a unique dual by-pass capacitance and thus superior bias circuit isolation.

The outermost end of the physical cavity 8 is closed by a tuning assembly including a dielectric tuning rod 18.

The microwave output energy is transmitted from and the reflected signal is coupled to the cavity 8 through a coupling impedance transformer 19 with a coupling iris 20 formed immediately to the base wall 9 between the cavity 8 and the coupling transformer recess or opening 19. The mixed signal within the cavity 8 is impressed on diode 10 with the output signal taken across the diode terminals. The transformer impedance of the coupling transformer is controlled by a tuning screw 21 which is threadedly mounted within an opening extending perpendicularly from the transformer 19. The tuning screw thus projects into the opening in selected spaced relation to the iris opening 20 to define a variable impedance transformer and provide for selected control adjustment of the load impedance.

The present invention particularly teaches the dual usage of a high frequency diode based on the impact avalanche transit time phenomena or the bulk effect negative conductance phenomena as a common active element of the oscillator means and of the detection means. Consequently, no further description of the physical arrangement is given other than as required to clearly explain the peculiar adaptation of the unit to the solid state diode as the active element.

The radio frequency or microwave energy is generated as the rsult of the matching of the reactance and negative real resistance of the solid state diode with its conjugate impedance. The diode's conjugate impedance is obtained using an open coaxial transmission line cavity which is less than a quarter wave length long. As will be readily understood by those skilled in the art the oscillation results because the solid state diode resistance is negative. This results in the continuous transmission of the microwave energy via the iris 20 and the coupling transformer 19 to a suitable antenna 2.

The antenna 2 may be of any suitable construction such as a rectangular or conical horn antenna which will produce the desired radiation pattern within which movement of a human being or other selected body is to be detected. An antenna with a low voltage standing wave ratio (VSWR) is desirable.

In accordance with the present invention the reflected microwave energy from a moving body is similarly fed via antenna 2 in a reverse manner into the cavity 8 and combined with the transmitted energy. The diode 1 is subjected to both fields and, in fact, functions as a mixer because of its non-linear characteristic.

The diode is preferably an avalanche diode which exhibits the most nearly perfect characteristic for a diode mixer. For example, Applicants have satisfactorily employed an avalanche diode type number L8851 manufactured and sold by Philco-Ford Company a division of Ford Motor Company. A graphically idealized illustration of such a diode is shown in FIG. 3 based on a measured volt-ampere characteristic 21a of such a diode and being typical of the characteristic thereof. The Gunn type diode which functions on a bulk effect phenomena has a generally similar type characteristic but with a continuous conduction of current. Thus, both the avalanche and the Gunn type diodes have only two distinct states of conduction as distinguished from the tunnel diode which has three states of conduction. The avalanche diode has two active or conducting regions separated by a non-active or approximately zero conduction region whereas the Gunn diode has a single pair of intersecting active regions which are essentially intersecting straight line characteristics.

In the operation of the avalanche device in accordance with the present invention, the transmitted signal and the received signal are present in the oscillator cavity and impressed on the diode 10. The non-linear characteristic of the oscillator diode directly mixes the two frequencies producing the desired Doppler or difference frequency. This is passed by the low pass filter and amplifying unit 5 to produce the isolated Doppler output signal. Although both the sum and the difference frequencies of the transmitted and received signals are generated along with the other higher order harmonic terms, the Doppler or difference frequency is only processed, the other signals of all other frequencies being eliminated by the low pass filter network.

Applicants have found that the avalanche type diode produces a significant output at the desired operating frequencies. Further, the diode cavity 8 is coupled through an impedance transformer which permits highly significant and improved operation of the two terminal oscillator-mixer as an intrusion detection apparatus.

Thus, the oscillator is desirably formed with a high Q factor to minimize the effect of the load impedance. Applicants' analysis of the significant characteristics for an intrusion detection apparatus including the output power of the oscillator, the efficiency of conversion and the Doppler mixer sensitivity for any given input power level has permitted the development of a highly satisfactory combined apparatus. Applicants have found that although the several characteristics vary with the input power level or bias they do not peak at the same level. The diode's impedance varies as a function of the bias and, in turn, the diode's impedance controls maximizing of the several characteristics. Further, a different diode impedance is required for the maximizing of any one given characteristic. Applicants further realize, however, that the failure to have coincident peaking of the output power efficiency and mixer sensitivity often permits the significant reduction in the output power without greatly affecting the amplitude of the Doppler motion signal.

FIG. 4 illustrates typical characteristic curves for the above characteristics with varying input power. Curve 22 shows the sensitivity of the Doppler mixer unit with increasing input bias power to the oscillator. The characteristic rapidly rises to a break point after which only insignificant increases occur with increasing input power. This is true even though the efficiency characteristic 23 continues to increase significantly while the power output increases as a relatively straight line characteristic 24. The sensitivity break point as shown by trace 22 of the illustrated embodiment of the invention breaks to a relatively straight line characteristic at approximately 58 miliwatts of output power and a sensitivity value of approximately 240 microvolts. Beyond this point a 60 percent increase in the output power will produce a mere 10 percent increase in the Doppler motion signal amplitude. Thus Applicants have found that the output power level can be optimized by interrelating the output power requirement to the sensitivity of the unit.

Figure 5:
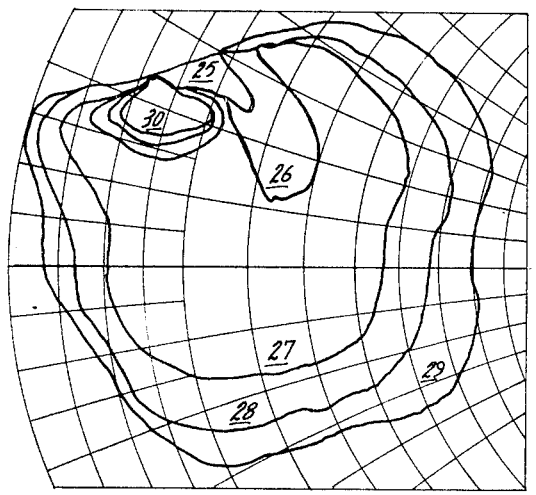
FIG. 5 is a graphical illustration showing the sensitivity contours as a function of Load Impedance on a Smith Chart.

Further, the magnitude of the Doppler motion signal is directly related to the load impedance of the oscillator-mixer. The load, in turn, is determined by the impedance of the system's antenna 2 and the impedance of the oscillator-mixer coupling impedance transformer 19. As shown, the impedance transformer 19 is a reduced height wave guide including a variable depth tuning element or screw 21. This permits varying of the impedance transformer characteristic such that the antenna's load impedance will closely match the oscillator-mixer impedance. Thus, as the tuning screw depth within the reduced height wave guide is varied with respect to the iris opening the impedance characteristic will change accordingly. The spacing of the screw from the iris opening will also, of course, affect its characteristic. The characteristic effect on the sensitivity of the unit is graphically illustrated in FIG. 5 wherein the various sensitivity contours 25 – 30, inclusive, as a function of a Smith Chart load impedance are shown for a structure such as shown in FIG. 1, including and employing an avalanche diode as heretofore described. Each curve is a constant sensitivity contour. The sensitivity contours thus permit identification of the most desirable impedance region for operation as well as the impedance regions to be avoided. Thus a family of six load impedance regions or curves 25 – 30 is illustrated. The several curves 25 through 30 illustrate decreasing orders of sensitivity, as follows:

| Curve 25 | 1000–400 |
| Curve 26 | 400–200 |
| Curve 27 | 200–100 |
| Curve 28 | 100–60 |
| Curve 29 | 60–30 |
| Curve 30 | 30–0 |

The region of curve 25 has a very high sensitivity but covers a small load impedance area and has a very significant variation in the height or sensitivity of the contour. Thus, the area within curve 25, as a contour, is a relatively steep hill configuration indicating the variation of 400 at the edges to 1,000 at the center.

The region of curve 27 generally indicates a most favorable load impedance region of operation. This region does not provide maximum Doppler motion signals. However, the region of curve 27 does not include any zero sensitivity portion and does encompass a relatively large range of impedance values as opposed to the relatively small areas covered by curves 25 and 26. Thus the region of curve 27 produces and permits reliable continuous sensitive performance in the presence of large variations in load impedances.

Various avalanche and bulk effect type diodes were studied with different input impedance and performance characteristics. The same type of sensitivity contours can be obtained on a Smith Chart with variations in shape, position and amplitude.

In accordance with a further aspect of the illustrated embodiment of the invention, the diode oscillator is modulated by loosely coupling a general purpose diode 32 to the open end of the oscillator-mixer cavity.

In the illustrated embodiment of the invention, the diode 32 is coupled to the cavity 8 through a small coupling loop 33 passed through an opening 34 in the cavity body 1 immediately above the oscillator's open coaxial transmission line 11. The modulating diode 32 is interconnected to a modulating source 35 via a feed-through capacitor 36. The loop 33 is thus disposed within the fringing field of the oscillator's open transmission line cavity and establishes a relative loose coupling therebetween. This particular location of the modulation circuitry is particularly important to minimize the changing of the oscillator's cavity impedance which results in the stability of the oscillator circuitry.

The present invention thus provides a highly improved combined diode oscillator-mixer for Doppler frequency motion or intrusion detection systems and the like. The avalanche or Gunn diode characteristics minimize the complexity and expense of the system while maintaining a highly desirable sensitivity and power consumption.

Various modes of carrying out the invention are contemplated as being within the scope of the following claims, particularly pointing out and distinctly claiming the subject matter which is regarded as the invention.

We claim:

1. In a Doppler frequency generating oscillator-mixer apparatus, comprising a microwave cavity housing having an open-ended transmission cavity, a solid state two-terminal diode element having only two distinct states of conduction including one state defining a negative resistance characteristic, said one state being established by selected bias input potential, said diode element being mounted within the base of said cavity and defining a coaxial conductor with said cavity which is less than a quarter wave length, input bias means connected to said diode to bias the diode to said one state, load means including a common transmitting-receiving opening coupled to an antenna unit for transmitting and receiving microwave energy with respect to said cavity, said cavity impedance and said diode impedance and said load impedance being selected to provide for substantial mixing of the transmitted and received signals by said diode element and generating a significant Doppler frequency signal, and means connected to said solid state two-terminal device and responsive to the Doppler frequency signals generated by said solid state two-terminal device.

2. The apparatus of claim 1 wherein said solid state two-terminal device is an avalanche diode of the impact avalanche transit time phenomena.

3. The microwave detection apparatus of claim 1 wherein the solid state two-terminal device is a diode operating with a bulk effect negative conduction characteristic.

4. The apparatus of claim 1 wherein said input bias means establishes an input power level creating optimum sensitivity with minimum output power and thereby optimizes the amplitude of the Doppler motion signal for a minimum input power.

5. The apparatus of claim 1 including a coupling iris to said oscillator microwave cavity, a reduced height wave guide cavity adjacent and coupled to said iris opening and including tuning means to vary the impedance of the reduced height wave guide and defining an impedance transformer for matching of the antenna's load impedance to the impedance of the cavity and diode.

6. The apparatus of claim 5 wherein said tuning means includes a tuning screw selectively positioned into said reduced height wave guide to control the impedance of the impedance transformer, said tuning screw being spaced from the iris opening such that its impedance locus permits operation on a Smith Chart sensitivity contour characteristic in accordance with a desired sensitivity control.

7. The apparatus of claim 6 wherein said tuning screw is selected to establish a region of operation within the complete load impedance region in which a sensitivity contour, which establishes a Doppler motion signal, is less than maximum but avoids zero sensitivity.

8. The apparatus of claim 1 including a modulating diode, a coupling member connected to the modulating diode and disposed in the fringing field of the open transmission line cavity to couple the modulating diode to the cavity.

9. The apparatus of claim 8 wherein the coupling means is a small loop passed through a hole in the cavity wall immediately adjacent the open coaxial transmission line and a feed-through capacitor interconnecting the modulating diode to a modulating power supply.

10. In a solid state microwave cavity oscillator for generating and detecting motion within a microwave energy field, comprising a microwave cavity housing having an open-ended cavity, a microwave diode element secured within the lower end of the cavity, a center coaxial conductor connected to said diode and projecting outward of said cavity and terminating within said cavity to define a coaxial transmission line, an iris coupling opening to said cavity for transmitting and receiving of microwave energy, an impedance transformer with a reduced height wave guide adjacent said iris opening and having means coupled to said diode element to operate said diode element above 4 GHz, said input power level being established and selected to produce a diode impedance establishing less than maximum output power, said output power being selected in accordance with a significant increase in efficiency in the mixer characteristic of the diode element to thereby minimize the input power requirements while maintaining significant motion Doppler signal, said impedance transformer being adjusted to establish a Doppler motion sensitivity avoiding all zero sensitivity while establishing reliable continuous sensitive response to motion with significant variations in the load impedance so presented to the oscillator-mixer cavity.

11. The apparatus of claim 10 including a modulating diode, a coupling member connected to the modulating diode and disposed in the fringing field of the open transmission line cavity to couple the modulating diode to the cavity.

12. The apparatus of claim 11 wherein the coupling means is a small loop passed through a hole in the cavity wall immediately adjacent the open coaxial transmission line and a feed-through capacitor interconnecting the modulating diode to a modulating power supply.

13. The apparatus of claim 1 including a bias assembly secured within said housing and including a bias disc connected to said coaxial conductor, a dielectric member clamped to the housing by said bias disc and defining a first RF by-pass path to said housing, a connector pin connected to the bias disc and projecting outwardly of the housing, and a relatively thin second dielectric member surrounding said connector pin and defining a second RF by-pass path to said housing.

14. The apparatus of claim 13 wherein said connector pin is mounted within an opening in a threaded metal support and includes a body portion substantially filling said opening, said second dielectric member being a tape-like element disposed between the body portion and the metal support.

* * * * *